United States Patent [19]

Larsson et al.

[11] Patent Number: 5,545,079
[45] Date of Patent: Aug. 13, 1996

[54] APPARATUS FORMING A CUTTING MACHINE OR CIRCULAR SAW

[75] Inventors: Håkan Larsson, Mölndal; Ove Donnerdal, Partille, both of Sweden

[73] Assignee: Aktiebolaget Electrolux, Sweden

[21] Appl. No.: 231,467

[22] Filed: Apr. 22, 1994

[30] Foreign Application Priority Data

May 3, 1993 [SE] Sweden ................... 9301506

[51] Int. Cl.⁶ ............... B24B 41/00; B28D 1/04
[52] U.S. Cl. ............ 451/342; 451/236; 451/344; 451/347; 451/429; 451/439; 30/372; 125/13.01; 125/13.03
[58] Field of Search ............ 451/236, 342, 451/344, 347, 358, 429, 439; 30/372, 388; 83/743, 745, 698.41, 699.21; 125/12, 13.01, 13.03, 14, 15

[56] References Cited

U.S. PATENT DOCUMENTS

| | | | |
|---|---|---|---|
| 3,562,959 | 11/1968 | Dooley, Jr. | 451/347 |
| 3,974,596 | 8/1976 | Huboud-Peron | 51/178 |
| 4,033,074 | 7/1977 | Lutts | 51/178 |
| 4,068,415 | 1/1978 | McIlrath | 51/178 |
| 4,156,991 | 6/1979 | McIlrath | 51/178 |
| 4,472,880 | 9/1984 | Johansson | 30/389 |
| 4,765,098 | 8/1988 | Duff et al. | 51/99 |

FOREIGN PATENT DOCUMENTS 2908392  9/1979  Germany ............... 451/429

*Primary Examiner*—Bruce M. Kisliuk
*Assistant Examiner*—Eileen P. Morgan
*Attorney, Agent, or Firm*—Michael D. Bednarek; Kilpatrick & Cody

[57] ABSTRACT

An apparatus forming a portable, hand-operated machine (1, 1', 1"), having a circular cutting wheel (4) or saw blade (4") which is rotatable about a center of rotation (5, 5"), comprises a double-armed holder (9) with a rear arm (20) which, at its rear, free end (27), is connected to the machine at a first hinge, rotatable about a first axis of rotation (18, 18a, 18b, 18") parallel to the center of rotation of the cutting wheel or the saw blade, and, at the other end, is connected rotatably, by means of a toggle joint (22), to a front arm (21) which in turn is connected rotatably, at its front, free end, to a securing device about a second axis of rotation at a second hinge, for rotatable anchoring of the holder and, thus, of the machine on the object which is to be cut or sawn. The center line (18, 18a, 18b, 18") of the said first axis of rotation intersects the cutting wheel, the saw blade or the space possibly present inside the saw blade, if the latter is annular, at a point between the center of rotation of the cutting wheel or saw blade and the periphery. The invention also relates to a system in which the apparatus can be included as a component, and to a securing device included in the system.

11 Claims, 7 Drawing Sheets

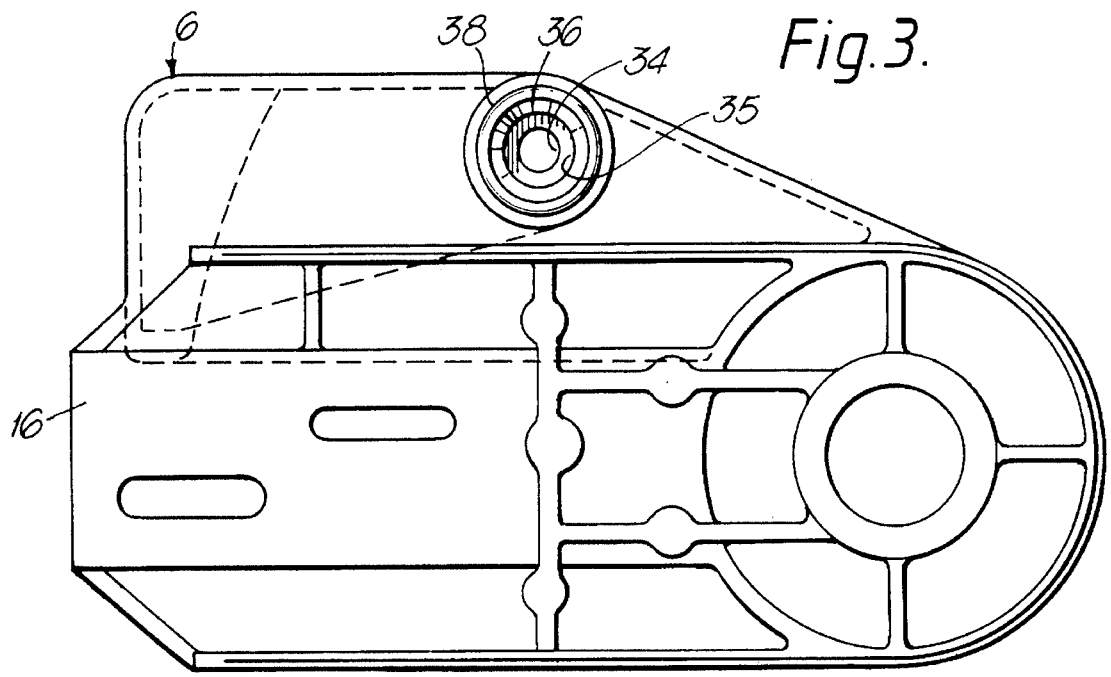
Fig.3.
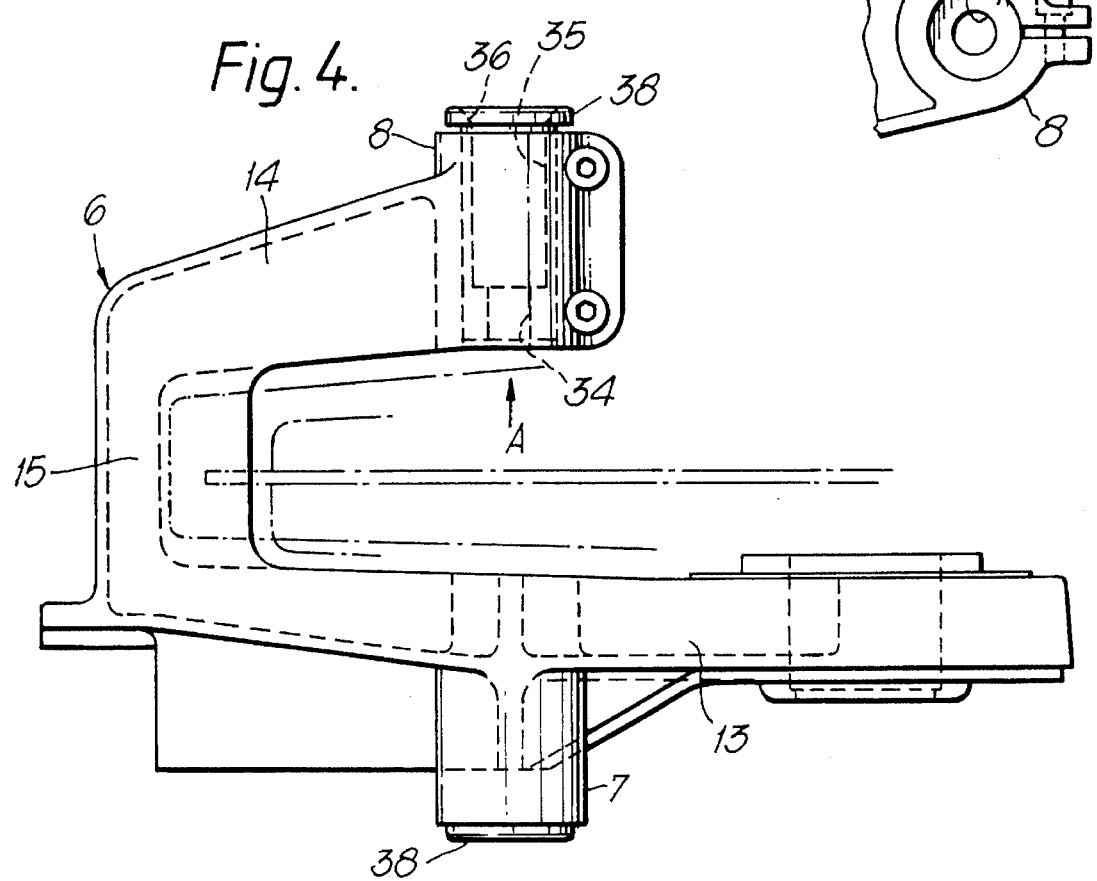
Fig.4.
Fig.4A.

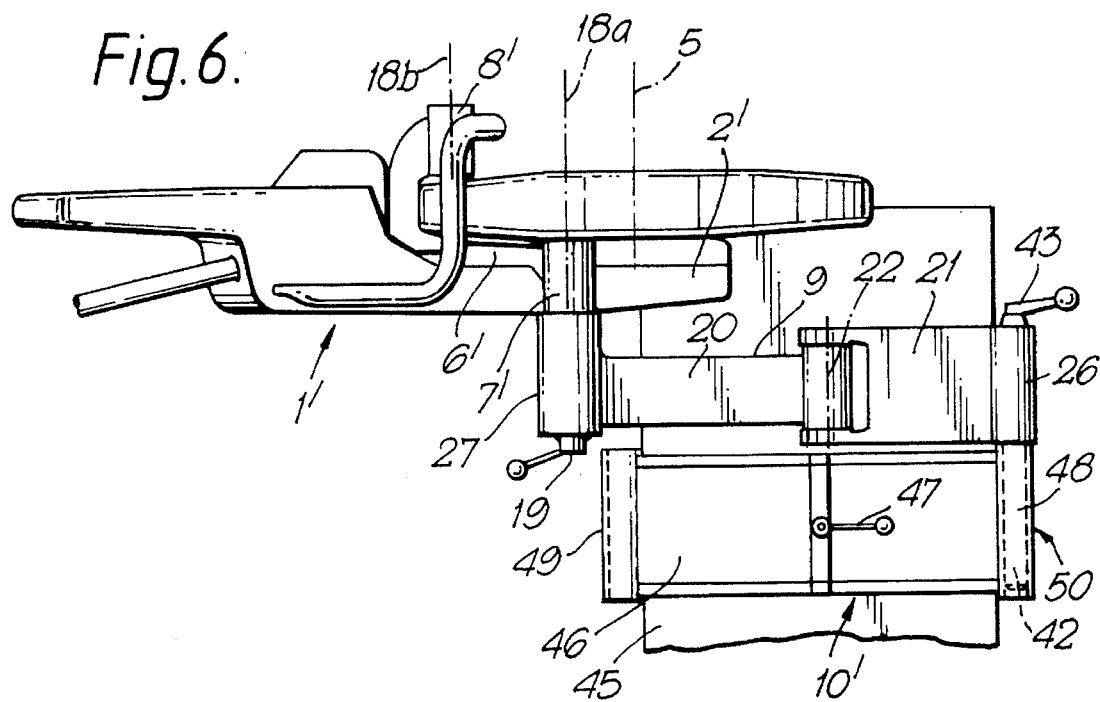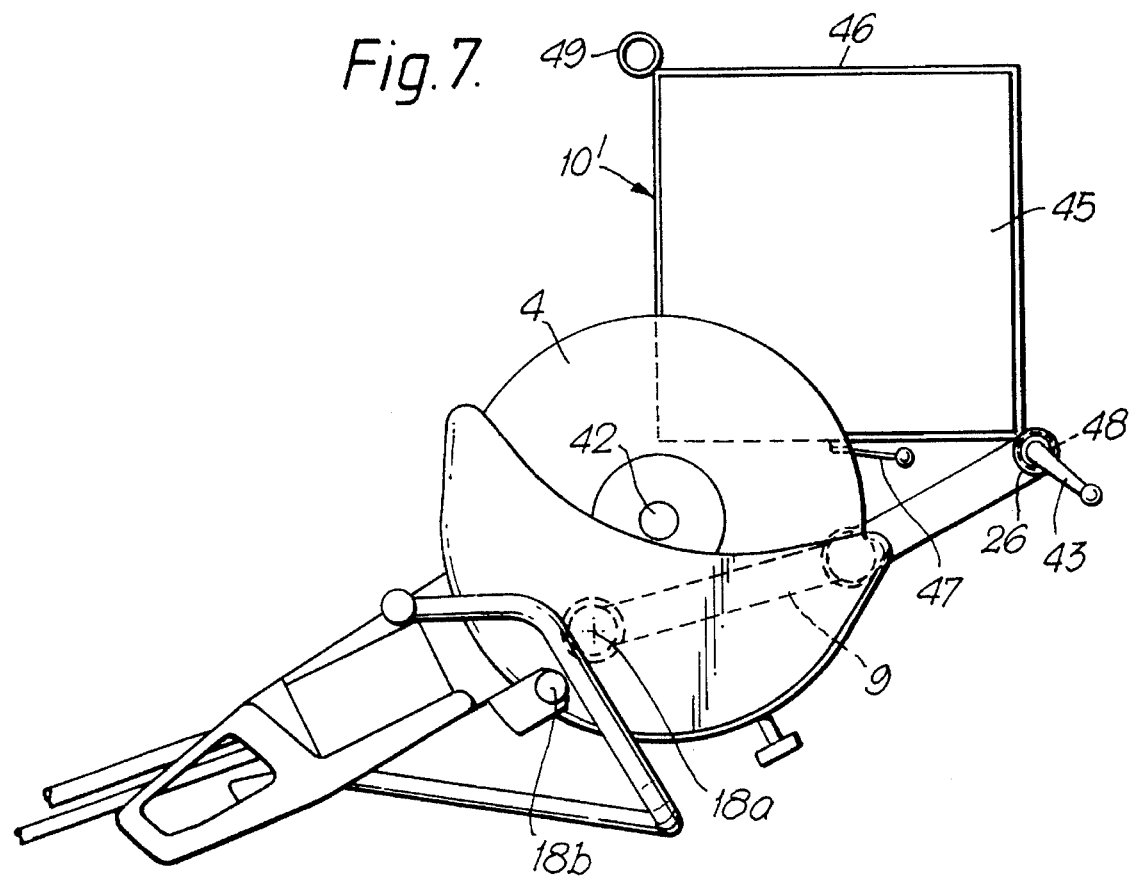

Fig. 9.
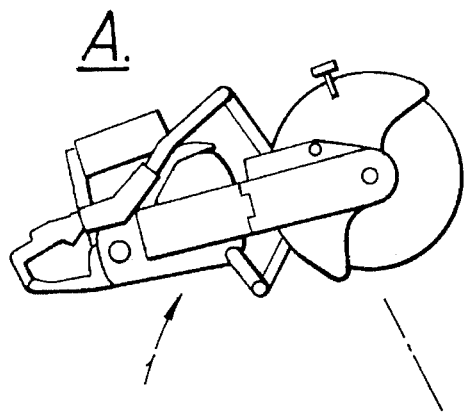
A.
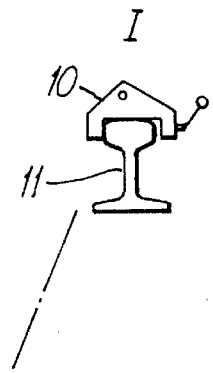
I
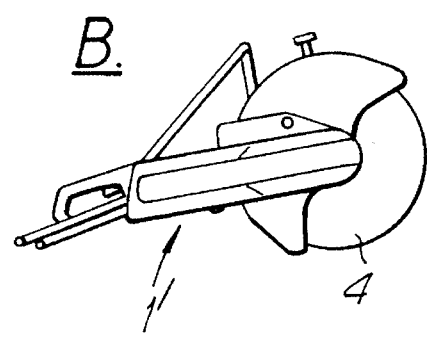
B.
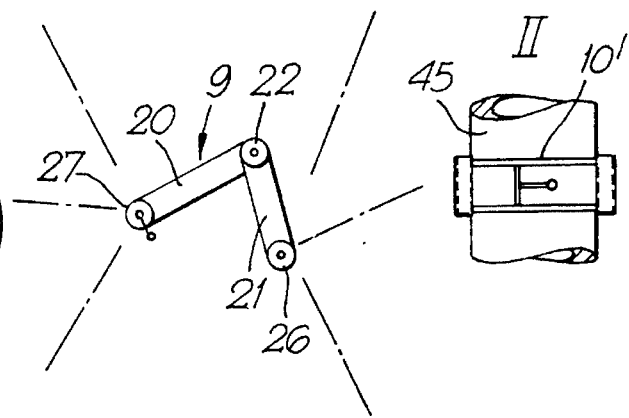
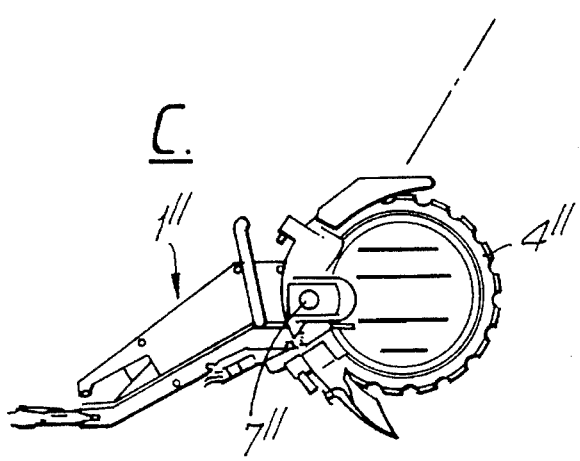
C.
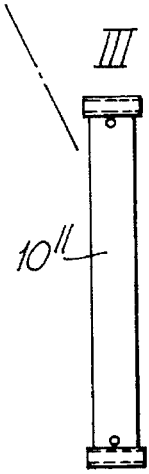
III

APPARATUS FORMING A CUTTING MACHINE OR CIRCULAR SAW

TECHNICAL FIELD

The invention relates to an apparatus forming a portable, hand-operated machine, having a circular cutting wheel or saw blade which is rotatable about a centre of rotation, comprising a double-armed holder with a rear arm which, at its free, rear end, is connected to the machine at a first hinge, rotatable about a first axis of rotation parallel to the centre of rotation of the cutting wheel or the saw blade, and, at the other end, is connected rotatably, by means of a toggle joint, to a front arm which in turn is connected rotatably, at its front, free end, to a securing device about a second axis of rotation at a second hinge, for anchoring of the holder and, thus, of the machine on the object which is to be cut or sawn, all this for the purpose of ensuring that the machine with the cutting wheel or the saw blade will be able to be displaced relative to the said object at right angles to the axis of rotation during turning of the arms at the said first and second hinges and at the said toggle joint. The invention also relates to a system in which the abovementioned components are included, and to a securing device for the holder, which securing device is included in the system.

BACKGROUND TO THE INVENTION

Apparatuses of the type described above are used, inter alia, in order to cut a railroad rail at right angles to the longitudinal direction of the rail. The securing device in this case consists of a screwy vice which is mounted on the rail. In these apparatuses it is normal for the holder with the arm, which is referred to above as the rear arm, to be connected to the machine at a hinge, rotatable about an axis of rotation outside the rear edge of the cutting wheel. Such an apparatus is described, for example, in U.S. Pat. No. 3,974,596. In order to be able to mount the machine in such a way that the cutting wheel can move free from the rail, the arms must have a considerable length. Their considerable length also means that they have to be made robust in order to exhibit sufficient bending rigidity. The considerable length and the robust construction in turn mean that the whole holder is heavy. The weight alone means that it is therefore difficult to carry the machine with the holder mounted on the machine. In addition, with the said long arms, the holder drags along the ground if the machine is carried in the normal way by a person of normal height. These circumstances mean that it is necessary in practice to detach the holder from the machine before transporting it over any appreciable length, so that it can be carried as two separate loads, and thereafter to secure the holder again on the machine. It will be understood that this is laborious and constitutes a considerable disadvantage in apparatuses of the known type which has been described.

BRIEF DESCRIPTION OF THE INVENTION

An object of the invention is to provide an apparatus of the type specified in the introduction, having a holder whose atom have a smaller overall relative length (length in relation to the diameter of the cutting wheel) than is otherwise normally the case, for example according to said U.S. Pat. No. 3,974,596, but which nevertheless permits the same long saw cuts as does a holder with arms of conventional length. In accordance with a first aspect of the invention, this is achieved by virtue of the fact that the centre line of the said first axis of rotation intersects, in its continuation, the cutting wheel, the saw blade or the space possibly present inside the saw blade, if the latter is annular, at a point between the centre of rotation of the cutting wheel or saw blade and the periphery.

The said first hinge can be formed by a butt hinge or pivot hinge comprising a first spindle or pivot pin in a bearing housing at the free end of the rear arm of the holder, in which case the spindle has an extension piece directed towards the machine, and the machine has, at least on one side of the plane of the cutting wheel or saw blade, a spindle attachment accommodating the extension piece. The spindle attachment or spindle attachments is/are expediently arranged at a level above a drive chain, drive belt or other power transmission between a drive motor and the axis of rotation of the cutting wheel or the saw blade.

It can in some cases be desirable to be able to cut or saw from another direction too. In order to permit this, known apparatuses, such as that according to said U.S. Pat. No. 3,974,596, have a single spindle attachment behind the cutting wheel, in which spindle attachment the extension piece of the spindle can be optionally introduced from either direction and can be anchored in a threaded hole, which intersects the plane of the cutting wheel behind the cutting wheel. In the present invention too, the requirement for optional anchoring of the extension piece of the spindle from one or other direction in the machine is also satisfied. This is achieved, according to one aspect of the invention, by virtue of the fact that the attachments for the spindle are arranged in the machine on both sides of the plane of the cutting wheel or the circular saw blade, in which case the spindle attachments can be arranged opposite one another in such a way that their centre lines coincide, or, alternatively, are arranged on both sides of the cutting wheel, not opposite one another, but instead offset, so that their centre lines do not coincide, but are parallel to each other, which in certain cases can be an advantage.

The spindle attachments can be arranged in different ways on the machine, to the side of the plane of the cutting wheel or the saw blade. For example, they can be arranged in a yoke-shaped section, which extends around the edge of the cutting wheel. If, instead of a cutting wheel, a circular saw blade is used, for example a saw blade of the type which is described in U.S. Pat. No. 4,472,880, the spindle attachment is arranged only on one side of the saw blade, expediently in the cover which is included in the unit which accommodates a pulley driving the blade by means of engagement with its inner edge. A great advantage of these circular saw blades without a central drive shaft is that it is possible to saw much deeper with these than with conventional saw blades having a fixed, central drive shaft. On the other hand, these saw blades are relatively expensive, particularly when they are diamond-tipped. In order to provide a possibility of using interchangeable cutting machines with conventional cutting wheels and sawing machines with circular saw blades, the present invention also relates, in accordance with a further aspect of the invention, to a system consisting of a plurality of optionally usable and interchangeable components for cutting objects or for sawing or slicing through objects. According to this aspect of the invention, the system comprises at least one machine with a cutting wheel having a central drive shaft, one machine with a annular blade with centreless driving, that is to say without a central drive shaft, a holder which is common to both the machines and which has a rear arm which, at its rear, free end, can be connected to either machine at a first hinge, rotatable about a first axis of rotation parallel to the centre of rotation of the wheel or the blade, and is rotatably connected at the other end, by means of a toggle joint, to a front arm which in turn is connected rotatably, at its front, free end, to a securing device about a second axis of rotation at a second hinge for rotatable anchoring of the holder and, thus, the machine on the object which is to be cut or sawn, so that the machine with the cutting wheel or the saw blade, respectively, will be able to be displaced relative to the said object at right angles to the axis of rotation during the turning of the arms at the said first and second hinges and at the said toggle joint, in which case the continuation of the said first axis of rotation intersects the cutting wheel or the annular saw blade, respectively, at a point between the centre of rotation of the cutting wheel or the annular saw blade, respectively, and its periphery, the point of intersection between the continuation of the axis of rotation and the cutting wheel with central drive shaft lying nearer the centre of rotation than does the point of intersection between the continuation of the first axis of rotation and the annular saw blade, and the system comprises at least two different, exchangeable securing devices, each having at least one spindle attachment which can accommodate and anchor an extension piece of a spindle in the said second hinge, which extension piece is directed in the opposite direction compared to the extension piece of the spindle in the first hinge.

Securing devices have also been developed within the context of the invention, including a securing device for mounting the holder, in conjunction with the sawing of long cuts, for example, in a wall.

Further characteristics and features of, and advantages deriving from, the invention emerge from the attached patent claims and from the description which follows.

BRIEF DESCRIPTION OF THE FIGURES

In the following description, reference is made to the attached drawings, in which FIG. 3 represents a side view of a holder-fastening yoke, FIG. 4 represents a view from above of the same holder-fastening yoke, a pair of spindle attachments included in the yoke being shown in cross-section, FIG. 4A represents a view in the direction of the arrow A in FIG. 4, FIG. 6 shows a side view of a hydraulically driven cutting machine, with an apparatus according to the invention mounted using a special securing device, for cutting a pillar, FIG. 7 shows the same apparatus from above, FIG. 9 illustrates diagrammatically a number of possible variations to the system according to the invention.

DESCRIPTION OF PREFERRED EMBODIMENTS

Figure 1:
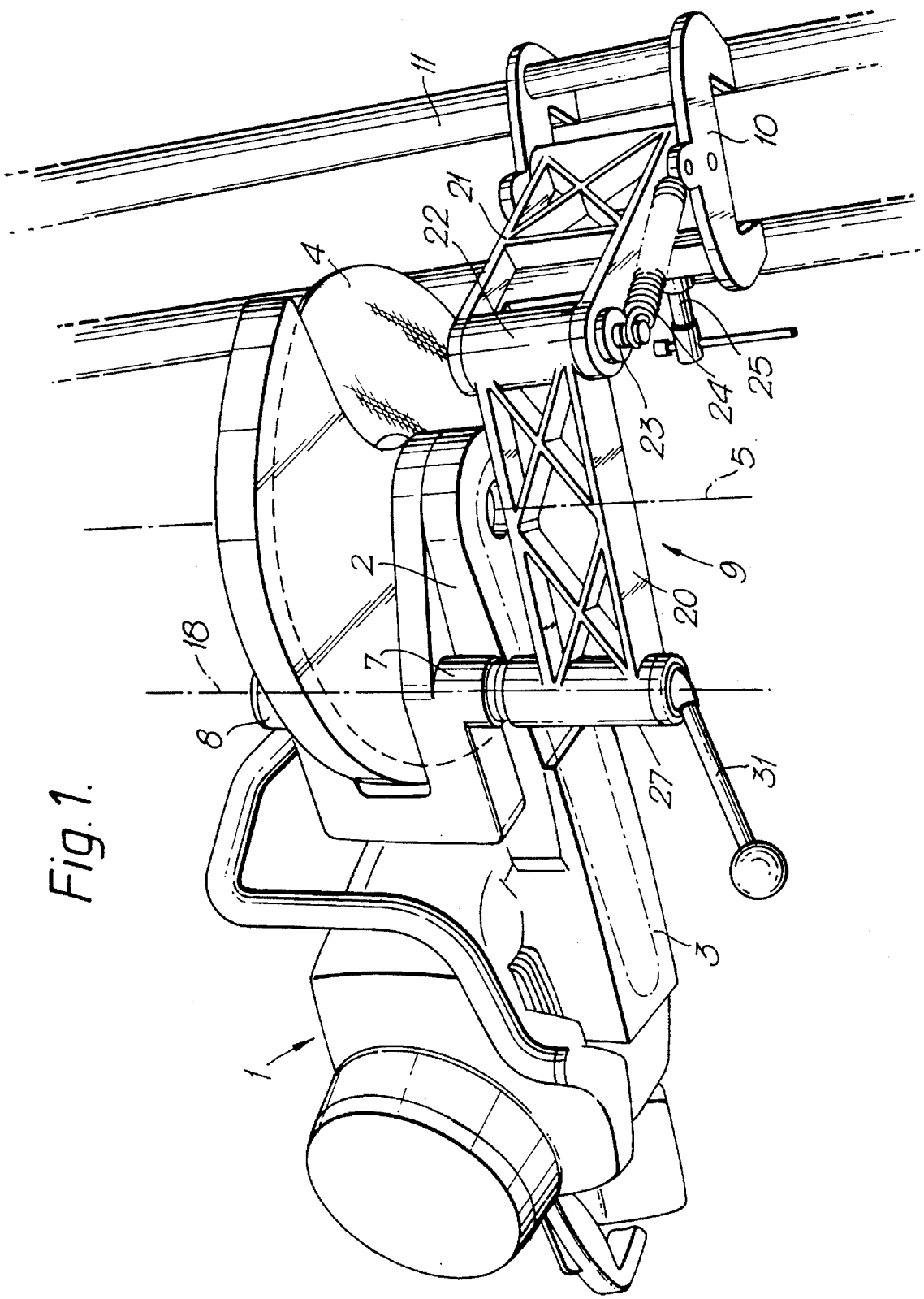
FIG. 1 shows a perspective view of an apparatus according to the invention on a cutting machine.

First, with reference to FIGS. 1–5, a cutting machine driven by a combustion motor is designated generally by the reference 1. A cutting arm 2 is arranged on the cutting machine. In the cutting arm there is a drive chain or drive belt 3, which drives a cutting wheel 4 via a central shaft (not shown) about a centre of rotation 5. A holder-fastening yoke 6 is mounted on the cutting arm 2, and a rotatable holder 9 is fastened in a spindle attachment 7 (a second spindle attachment is designated by 8). The holder 9 is in turn rotatably secured on a rail 11 with the aid of a securing device 10 which consists, in a known manner, of a screw vice.

The holder-fastening yoke 6, FIGS. 3 and 4, has a longer branch 13 on the right-hand side of the cutting wheel 4, a shorter branch 14 on the left-hand side of the cutting wheel, and a rib 15 behind the cutting wheel 4, which rib 15 connects the two branches 13 and 14 to one another. Furthermore, a securing plate 16 is arranged under the longer branch 13 and covers the front part of the cutting arm 2 and is joined to the latter.

According to the embodiment, the two spindle attachments 7, 8 are coaxial, that is to say are arranged with a common axis opposite one another on both sides of the cutting wheel 4 and at a level above the cutting arm 2. The spindle attachments 7, 8 are furthermore arranged so far forward that their common centre line 18 intersects the cutting wheel 4 at a point behind the centre of rotation 5, between the said centre of rotation and the periphery of the cutting wheel 4.

The holder 9 consists, in a manner known per se, of two arms, namely a rear arm 20 and a front arm 21, which are rotatably connected to each other by means of a toggle joint 22. The free end of the rear arm 20 is designed in essentially the same way as in the holder which is shown in the said U.S. Pat. No. 3,974,596 and comprises a bearing housing 27, FIG. 2, in which a shaft or spindle 19 is mounted, axially immovable. An extension piece 28 on the spindle 19 extends in the direction towards the machine. This extension piece 28 consists of a threaded point 30, a cylindrical section 32 and a conical section 29 nearest the bearing housing 27. On the other side of the bearing housing 27, the spindle 19 is provided with a handle 31, by means of which the spindle 19 can be turned in the bearing housing 27 when the extension piece 28 of the spindle is to be anchored in either of the spindle attachments 7, 8.

At the front end of the front arm 21 of the holder 9 there is a bearing housing 26, and a shaft 33 is rotatably movable in this bearing housing 26. The shaft 33 is secured, at both its ends, in a securing device 10 which can be secured on the rail 11 with the aid of a screw 25. A helical spring 24 extends between the securing device 10 and a pin 23 on the toggle joint 22.

The two spindle attachments 7, 8 are designed identically in order to be able to receive and anchor the projecting extension piece 28 of the spindle 19, and for this reason they have, furthest inside, an internally threaded hole 34 in a steel sleeve 38 for the threaded end-journal 30, a cylindrical section 35 for the cylindrical projecting section 32 of the spindle extension piece, and a conical mouth section 36 for the conical section 29 adjacent to the bearing housing 27. When mounting the holder 9 onto the machine 1, the threaded end 30 on the spindle extension piece 28 is screwed into the threaded hole 34 in one of the spindle attachments 7, 8 with the aid of the handle 31 until the conical section 29 on the spindle extension piece 28 engages with the conical mouth section 26 in one of the spindle attachments 7, 8. The rear arm 20 of the holder can then be turned in the bearing housing 27 about the spindle 19 situated in the bearing housing and anchored in the machine, the centre line of which spindle 19 coincides with the centre line 18 intersecting the cutting wheel 4.

Figure 5:
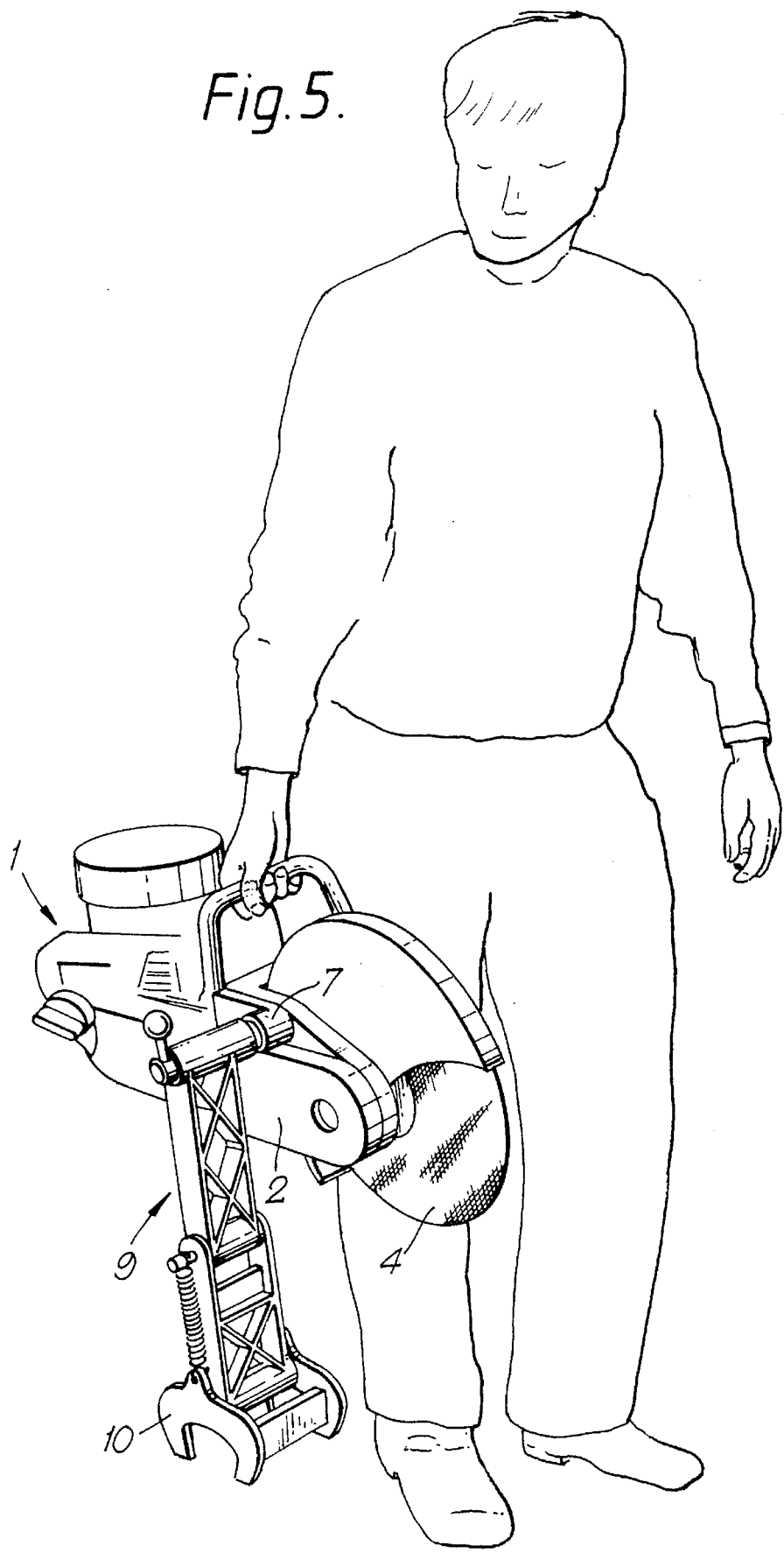
FIG. 5 shows how a cutting machine with an apparatus according to the invention can be carried.

By virtue of the fact that the spindle attachments 7, 8 for the spindle 19 are arranged further forward on the machine than is normally the case in the prior art, in which a single "double-sided" spindle attachment is arranged behind the rear edge of the cutting wheel, the overall length of the two arms 20, 21 of the holder can be made shorter, while retaining the radial range of the cutting wheel 4. In addition, the spindle attachments 7, 8 are arranged at a level which lies above the cutting arm 2 and, thus, also above the drive belt or equivalent 3, that is to say comparatively high up on the machine. This means that the machine 1 can be carried by the handle, with the holder 9 mounted in the machine, without the holder 9 or its securing device 10 dragging along the ground, at least not when the securing device 10 consists of a screw vice or equivalent, with comparatively small dimensions. This is illustrated in FIG. 5. By means of the positioning of the spindle attachments 7, 8, the integrated unit also becomes well-balanced, which also makes it easier to carry, as does the fact that the holder 9 can be made considerably lighter than known equivalent constructions.

The attachment 8 is slit in FIG. 4A, which permits a possibility of axial adjustment of the sleeve 38. In this way it is possible to compensate for different thicknesses of different cutting wheels 4 or saw blades when it is intended, for instance, to cut an object, for example a railroad rail, and to do half the cut from each side in order to compensate largely for intolerances in the construction, and where it is desired that the saw cuts from both directions should meet and coincide with great precision.

In FIGS. 6 and 7 a hydraulically driven cutting machine is designated generally by the reference 1'. The cutting wheel 4 is driven by a hydraulic motor about a centre of rotation 5 via a central drive shaft 42. A holder-fastening yoke 6' is mounted on the machine 1' above the cutting arm 2'. On the yoke 6' there is, on the fight-hand side of the cutting wheel 4, a right-hand spindle attachment 7' and, on the left-hand side of the cutting wheel 4, a left-hand spindle attachment 8'. The centre line 18a of the fight-hand spindle attachment 7' intersects the cutting wheel 4 at a point approximately between the centre line 5 of the cutting wheel 4 and the periphery of the cutting wheel (or slightly nearer the edge), while the centre line 18b of the left-hand spindle attachment 8' intersects the cutting wheel 4 very near its periphery. The example illustrates that the attachments for mounting the holder on the machine do not necessarily have to be arranged opposite one another. A significant relative lateral offsetting of the spindle attachments can instead afford special advantages for some applications or eliminate certain problems in some machines.

Figure 2:
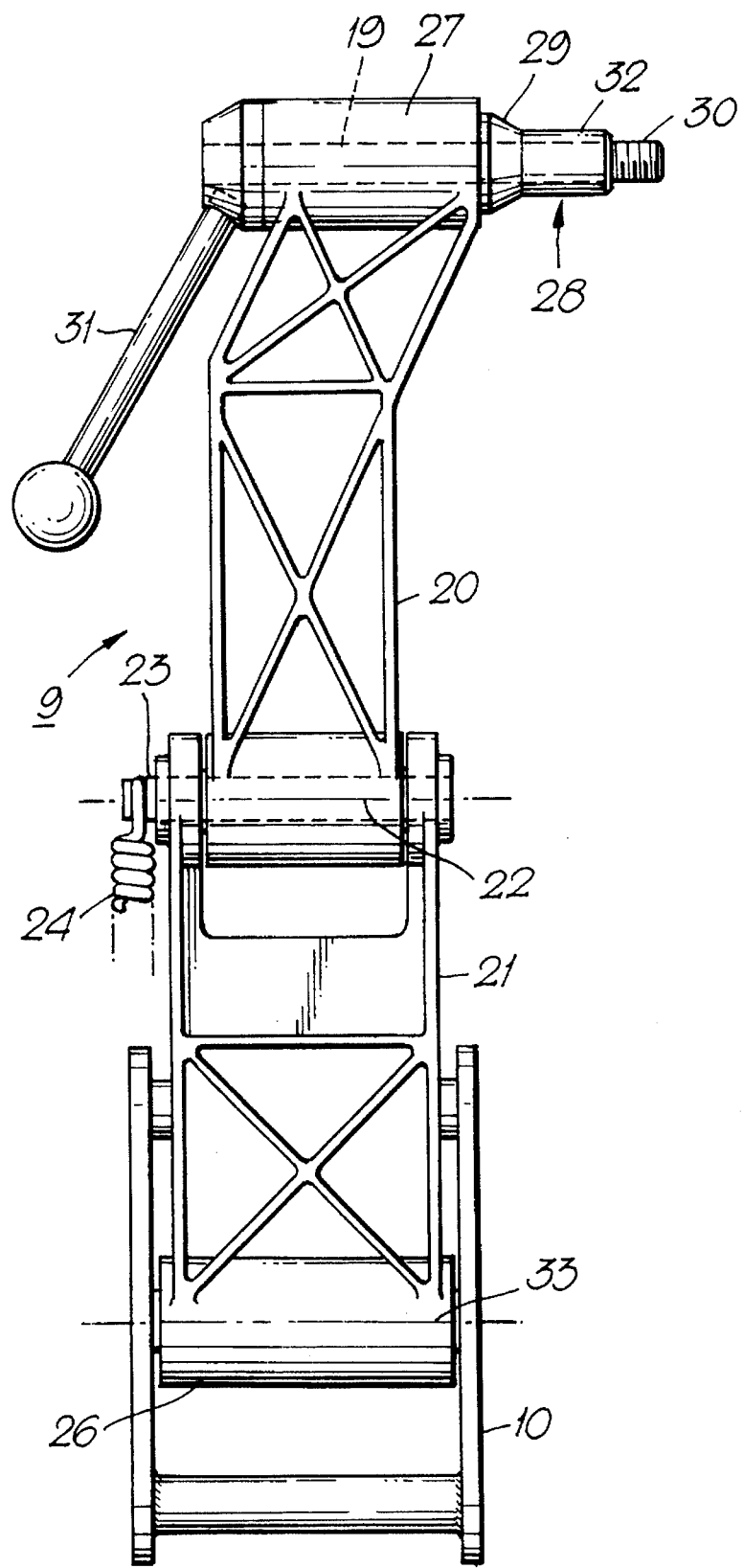
FIG. 2 is a plan view of a holder which, in a slightly modified embodiment (straight), is included in the apparatus according to FIG. 1.

The holder 9 in FIGS. 6 and 7 has been shown only diagrammatically, but is identical to that which has been shown in detail in FIGS. 1 and 2, with the exception of, on the one hand, the spring 24, which has been removed in this case, and, on the other hand, an extension piece 48 of the spindle in the front bearing housing 26. This extension piece 48 extends outwards towards the right from the bearing housing 26, that is to say in the opposite direction compared to the spindle extension piece 28 at the rear end of the holder. On the other side of the bearing housing there is a handle 43, which can be connected in an articulated manner to the rear end of the spindle in order to be able to screw the spindle end 48, projecting in the other direction, securely in a spindle attachment even when the latter bears closely on an object.

A securing device has been designated generally by 10' in FIGS. 6 and 7. It has been designed in order to cut, in cooperation with the holder 9 and the cutting machine 1', relatively thick posts, pillars 45, beams, pipes and the like. The securing device 10' in this case consists of a fixture 46, which extends round the pillar 45 and is mounted on the latter with the aid of a coupling 47 on one side. Arranged on the outside of this fixture 46 are two spindle attachments 49, 50. These can be designed in the same way as the spindle attachments 7, 8 in the machine 1.

According to this embodiment, the two spindle attachments 49, 50 are arranged in the area of two opposite comers of the pillar 45. By first placing the holder 9 with the spindle extension piece 48 in the one spindle attachment 50 and sawing as deep into the pillar 45 as the cutting wheel 4 will allow, and thereafter changing to the other spindle attachment 49 and sawing from the other direction, even relatively thick pillars 45 and the like can be cut.

The fixture 46 can consist of a flexible strip of metal, synthetic material or composite material, and the spindle attachments 49, 50 are expediently designed such that they can be moved at least to a certain extent along this strip-shaped fixture, so that their positioning can be adapted to the conditions of the object which is to be cut.

Figure 8:
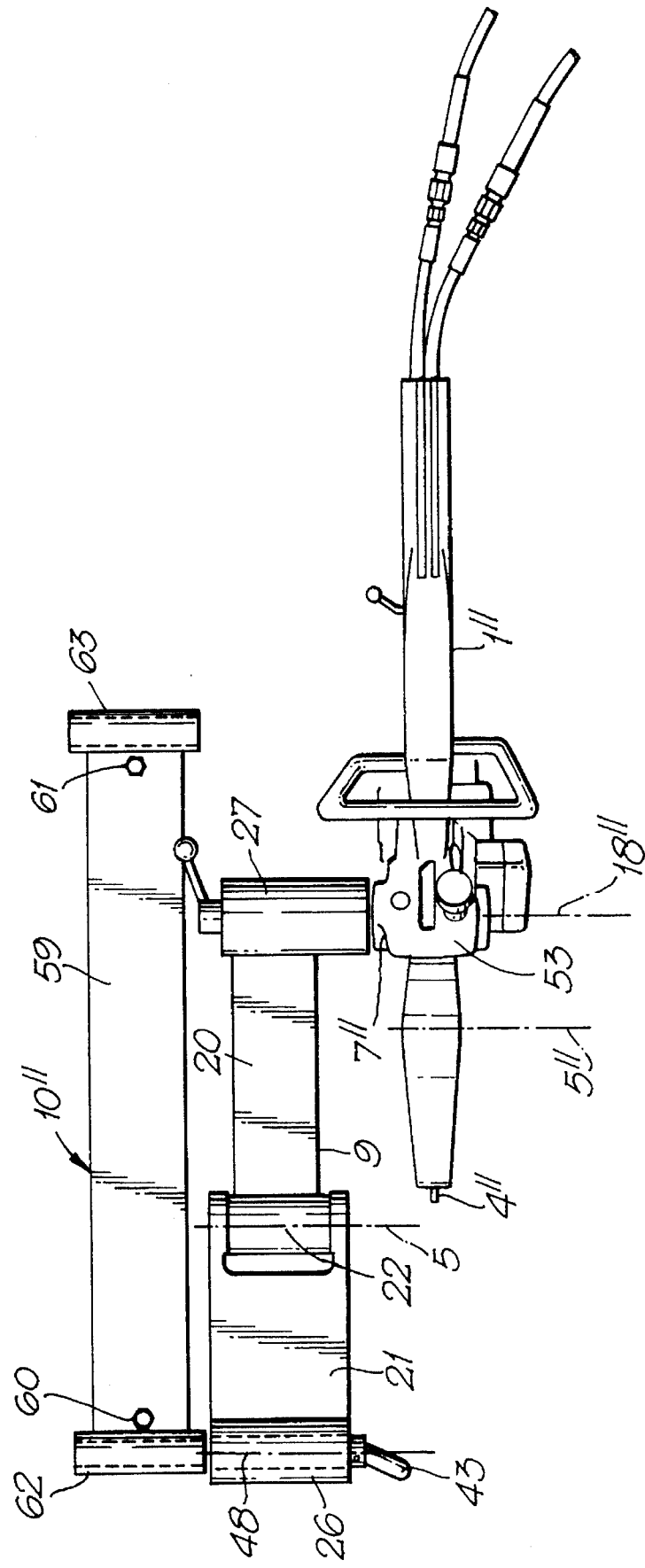
FIG. 8 shows the apparatus according to the invention on a machine with a annular saw blade, in which case the machine is mounted using a special securing device, for cutting a relatively long cut in, for example, a wall.

In the application according to FIG. 8 use is made of a hydraulically driven machine 1" of the type which drives an annular saw blade 4", that is to say a saw blade of the centreless type. A machine or a saw blade of this type is described, for example, in U.S. Pat. No. 3,974,596. This annular saw blade 4" is driven by means of a pulley with a wedge-shaped groove in which the inner, wedge-shaped edge of the saw blade engages. The said drive pulley is rotated by means of a sham, which in turn is rotated by a drive belt from the hydraulic motor. The cover 53, which covers the said drive pulley, also covers further members for holding and guiding the annular saw blade 4". On this cover 53 there is a spindle attachment 7" for the spindle extension piece 28 at the rear end of the holder 9. The holder 9 is designed in the same way as in the embodiment according to FIGS. 6 and 7. The centre line of the spindle attachment 7" has been designated by 18", and the centre of rotation of the annular saw blade 4" has been designated by 5".

The securing device 10", FIG. 8, consists of a straight bar 59, which can have a flat underside. The bar 59 can have a length of the order of magnitude of 1 meter. The securing device 10" can be secured on a wall by means of screws or the like 60, 61 in the bar 59. The bar 59 has, at each end, a spindle attachment 62 and 63, respectively. These can be designed in the same way as the spindle attachments 8, 9, 49, 50 described above, that is to say matching the spindle extension piece 48, which can be secured in either of the spindle attachments 62, 63 by means of the handle 43.

When using the arrangement according to FIG. 8, for example for sawing an approximately two-meter long, vertical cut for a door opening in a wall, the bar 59 is mounted vertically on the wall by means of the screws 60, 61, with a lower spindle attachment 62 approximately half a meter above the floor level. The machine 1" is secured in the holder 9, which in turn is secured with the spindle extension piece 48 in the spindle attachment 62 on the securing device 10". Thereafter, the machine 1" with the saw blade 4" is moved by rotating about the toggle joint 22 and the bearing housings 26, 27. If the arm 9 has a range of approximately half a meter, it is possible in this way first to saw downwards and then upwards or vice versa, and in this way to obtain a cut of approximately 1 meter. Thereafter, the holder is detached from the lower spindle attachment 62 and is moved up to the upper spindle attachment 63, after which the procedure continues, so that a further cut of approximately 1 meter is obtained, that is to say in all approximately 2 meters.

Common to the three applications which have been described hereinabove is the holder 9, which can be used for different machines 1, 1', 1" with suitably placed spindle attachments 7, 8, 7', 8' and 7", respectively, and different securing devices, such as a screw vice 10 for cutting of railroad rails 11, a fixture 10' for cutting a pillar 45, or a fixture 10" for sawing straight, long cuts in, for example, a wall. These possible combinations are also illustrated in FIG. 9. It should also be mentioned in this context that it is even possible to change the machine during ongoing work, while retaining the same securing device. For example, when cutting very thick pillars, columns or the like 45, or for sawing very deep cuts in a wall, floor or ceiling, it is possible to start by using, for example, a hydraulically driven cutting machine 1' for sawing as deep as is possible with the relatively inexpensive cutting wheel 4, and thereafter to change to the hydraulically driven cutting machine 1" which operates with the more expensive, diamond-tipped annular saw blade 4", with which it is possible to saw considerably deeper on account of the fact that this does not have any central drive shaft to impede the penetration of the saw blade into the object which is being sawn.

We claim:

1. Apparatus forming a portable, hand-operated machine (1, 1', 1"), having a circular cutting wheel (4) or saw blade (4") which is rotatable about a center of rotation (5,5"), comprising:

a double-armed holder (9) with a rear arm (20) and a front arm (21), the rear arm having a rear, free end (27) connected to the machine at a first hinge, the rear arm being rotatable about a first axis of rotation (18, 18a, 18b, 18") parallel to the center of rotation of the cutting wheel or the saw blade, and the rear arm having a front end connected rotatably, by means of a toggle joint (22), to a rear end of said front arm (21), the front arm having a front, free end connected rotatably to a securing device about a second axis of rotation at a second hinge, for rotatable anchoring of the holder and, thus, of the machine on an object which is to be cut or sawn, whereby the machine with the cutting wheel or the saw blade is displaceable relative to the said object at right angles to the first axis of rotation during turning of the arms at the said first and second hinges and at the said toggle joint;

wherein a center line (18, 18a, 18b, 18") of the said first axis of rotation intersects a plane of rotation of the cutting wheel or the saw blade at a point between the center of rotation of the cutting wheel or saw blade and a periphery of the cutting wheel or saw blade.

2. Apparatus according to claim 1, wherein the said first hinge is formed by a butt hinge or pivot hinge comprising a first spindle or pivot pin (19) in a bearing housing (27) at the rear, free end of the rear arm of the holder, the first spindle having a first extension piece (28) directed towards the machine, and a spindle attachment (7, 8) accommodating the first extension piece being arranged in the machine, at least on one side of the plane of rotation of the cutting wheel or the saw blade.

3. Apparatus according to claim 2, wherein the spindle attachment in the machine is arranged in a holder-fastening yoke (6, 6') which extends around a rear edge of the cutting wheel or saw blade.

4. Apparatus according to claim 2, wherein the spindle attachment (7, 8) in the machine (1) is arranged above a drive chain, drive belt or equivalent power transmission (3) between a drive motor and the axis of rotation of the cutting wheel or saw blade.

5. Apparatus according to claim 2, wherein the spindle attachment in the machine comprises first and second spindle attachments arranged on opposite sides of the cutting wheel or saw blade, respectively, said spindle attachments being aligned with each other so that center lines (18) of the spindle attachments coincide.

6. Apparatus according to claim 2, wherein the spindle attachment in the machine comprises first and second spindle attachments arranged on opposite sides of the cutting wheel or saw blade, respectively, said spindle attachments being offset so that center lines (18a, 18b) of the spindle attachments do not coincide but are parallel to each other.

7. Apparatus according to claim 2, wherein the said second hinge is also formed by a butt hinge or pivot hinge with a second spindle extension piece (48) which projects in a direction opposite to that in which the first extension piece projects, and the securing device (10', 10") comprises at least one spindle attachment for anchoring the said second spindle extension piece in the said second hinge of the holder.

8. A system comprising a plurality of separately usable and interchangeable components for cutting objects or for sawing or slicing through objects, the system comprises:

a first component (1, 1') with a cutting wheel (4) having a central drive shaft, a second component (1") with a circular saw blade (4") with a centerless driving, a holder (9) which is common to both the first and second components and which has a rear arm (20) and a front arm (21), the rear arm having a free, rear end, that can be connected to either component at a first hinge, a first spindle having a first extension piece (28) being arranged at said first hinge, the rear arm being rotatable about a first axis of rotation parallel to the center of rotation of the cutting wheel or the circular saw blade, respectively, and the rear arm having a front end rotatably connected, by means of a toggle joint, to a rear end of said front arm (21), the front arm having a front, free end rotatably connected about a second axis of rotation at a second hinge for anchoring the holder and, thus, the respective component, on the object which is to be cut or sawn, whereby the first component with the cutting wheel or the second component with the saw blade is capable of being displaced relative to the said object at right angles to the first axis of rotation during turning of the arms at the said first and second hinges and at the said toggle joint, centerline of the said first axis of rotation intersecting a plane of rotation of the cutting wheel or the circular saw blade, respectively, at a point between the center of rotation of the cutting wheel or saw blade and a periphery of the cutting wheel or saw blade, and at least two separately usable securing devices that are exchangeable with one another for securing the system to an object to be cut or sawn, each securing device having at least one spindle attachment which can accommodate a second extension piece (48) on a second spindle arranged at the said second hinge at the front end of the front arm of the holder, which second extension piece extends outwards from said second spindle in an opposite direction compared to the first extension piece (28) of the first spindle at the first hinge.

9. The system according to claim 8, wherein at least one of said securing devices has at least two separately usable spindle attachments for accommodating the said second extension piece (48) at the front, free end of the front arm of the holder.

10. The system according to claim 9, wherein said securing device comprises a fixture capable of being turned around and fastened on a post, pillar, or beam, the said two separately usable spindle attachments being arranged on the said fixture.

11. The system according to claim 9, wherein said securing device comprises a fixture in the form of a bar having first and second ends, said bar being capable of being attached to a wall or other flat object, the said separately usable spindle attachments being arranged at the first and second ends of the bar.

* * * * *